(12) United States Patent
Parush Tzur et al.

(10) Patent No.: US 11,455,676 B2
(45) Date of Patent: Sep. 27, 2022

(54) DATA-DRIVEN HARDWARE CONFIGURATION RECOMMENDATION SYSTEM BASED ON USER SATISFACTION RATING

(71) Applicant: EMC IP Holding Company LLC, Hopkinton, MA (US)

(72) Inventors: Anat Parush Tzur, Beer Sheva (IL); Avitan Gefen, Tel Aviv (IL); Amihai Savir, Sansana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 73 days.

(21) Appl. No.: 16/402,421

(22) Filed: May 3, 2019

(65) Prior Publication Data

US 2020/0349629 A1 Nov. 5, 2020

(51) Int. Cl.
*G06Q 30/06* (2012.01)
*H04L 41/5009* (2022.01)
(Continued)

(52) U.S. Cl.
CPC ..... *G06Q 30/0631* (2013.01); *H04L 41/5009* (2013.01); *H04L 67/306* (2013.01); *H04L 67/535* (2022.05)

(58) Field of Classification Search
CPC . G06Q 30/0631; H04L 41/5009; H04L 67/22; H04L 67/306
(Continued)

(56) References Cited

U.S. PATENT DOCUMENTS

| | | | | |
|---|---|---|---|---|
| 7,885,902 B1 * | 2/2011 | Shoemaker | ............ | G06Q 10/10 705/319 |
| 10,694,002 B1 * | 6/2020 | Savir | .................... | H04L 67/42 |

(Continued)

FOREIGN PATENT DOCUMENTS

JP H0749883 B2 * 5/1995

OTHER PUBLICATIONS

Bachwani et al, "Mojave: A Recommendation System for Software Upgrades", Oct. 2012, Conference: Workshop on Managing Systems Automatically and Dynamically (Year: 2012).*

(Continued)

*Primary Examiner* — Matthew E Zimmerman
*Assistant Examiner* — Thomas Joseph Sullivan
(74) *Attorney, Agent, or Firm* — Ryan, Mason & Lewis, LLP

(57) ABSTRACT

Techniques are provided for recommending hardware configuration changes using a user satisfaction rating. One method comprises obtaining usage data indicating user activity for users on computing devices; generating a user profile for each user; clustering the users into user clusters based on the user profiles; determining, for a given user cluster, a satisfaction score for each user in the given user cluster based on the obtained usage data for each user on the computing device; providing suggested hardware upgrades for the computing device of a given user in the given user cluster, wherein the given user is selected based on a lower corresponding satisfaction score relative to the satisfaction scores of other users in the given cluster, and wherein the one or more suggested hardware upgrades are based on hardware configurations of other users in the given cluster having a higher corresponding satisfaction score.

20 Claims, 5 Drawing Sheets

(51) Int. Cl.
*H04L 67/306* (2022.01)
*H04L 67/50* (2022.01)

(58) Field of Classification Search
USPC .......................................................... 705/26.7
See application file for complete search history.

(56) References Cited

U.S. PATENT DOCUMENTS

| | | | |
|---|---|---|---|
| 2005/0010749 A1* | 1/2005 | Zomaya | G06F 8/64 713/100 |
| 2006/0218634 A1* | 9/2006 | Sodhi | G06Q 30/02 726/22 |
| 2007/0239554 A1* | 10/2007 | Lin | G06Q 30/0212 705/26.7 |
| 2011/0004575 A1* | 1/2011 | Yang | G06F 1/324 706/12 |
| 2012/0117097 A1* | 5/2012 | Lam | G06Q 30/0251 707/758 |
| 2014/0100952 A1* | 4/2014 | Bart | G06Q 30/0255 705/14.53 |
| 2014/0278738 A1* | 9/2014 | Feit | G06Q 30/0201 705/7.29 |
| 2015/0369705 A1* | 12/2015 | Kruglick | H04L 51/043 702/188 |
| 2015/0370616 A1* | 12/2015 | Peterson | G06Q 30/0282 719/320 |
| 2016/0124652 A1* | 5/2016 | Adamson | G06F 12/08 711/171 |
| 2018/0012242 A1* | 1/2018 | Phan | G06Q 30/0203 |
| 2019/0391898 A1* | 12/2019 | Vichare | G06F 11/3051 |

OTHER PUBLICATIONS

Belacel et al, "Splitting-merging Clustering Algorithm for Collaborative Filtering Recommendation System", 2018, 10th International Conference on Agents and Artificial Intelligence (Year: 2018).*

Tran et al, "Clustering-Based Collaborative Filtering Using an Incentivized/Penalized User Model", May 1, 2019, IEEE (Year: 2019).*

Yu et al, "Research on recommendation system based on interest clustering", Mar. 13, 2017, AIP Conference Proceedings (Year: 2017).*

Deshmukh et al, "A Scalable Clustering Algorithm for Serendipity in Recommender Systems," Nov. 17, 2018, IEEE International Conference on Data Mining Workshops (Year: 2018).*

Ma et al, "learning disentangled representations for recommendation", 2019, Proceedings of the Thirty-third Conference on Neural Information Processing Systems (Year: 2019).*

Irina et al, "Review of Clustering-Based Recommender Systems", 2021, ARXIV Cornell (Year: 2021).*

U.S. Appl. No. 16/402,822, filed contemporaneously herewith, entitled, "Method and System for Addressing User Discontent Observed on Client Devices."

* cited by examiner

DATA-DRIVEN HARDWARE CONFIGURATION RECOMMENDATION SYSTEM BASED ON USER SATISFACTION RATING

FIELD

The field relates generally to techniques for recommending a hardware configuration to a user.

BACKGROUND

When a customer is seeking to upgrade a computing device, many sellers of such computing devices use a recommender system that is integrated into a web site of the seller. The recommender systems often track the interactions of the customer with the computing device and other behavior of the customer, including previous purchases and profile information. The recommender systems typically build a customer profile and suggest a new product for the customer. With this approach, the suggested upgrade is the purchase of an entirely new computing device, as opposed to a fine tuning of a current hardware configuration of a given customer. Moreover, this approach does not differentiate one seller of such computing devices from other competitors in the computer manufacturing and/or retail market.

A need therefore exists for improved techniques for recommending changes to a hardware configuration of a customer.

SUMMARY

In one embodiment, a method comprises obtaining usage data indicating user activity for each of a plurality of users on at least one computing device; generating a user profile for each of the plurality of users; clustering the plurality of users into a plurality of user clusters based on the user profiles; determining, for a given user cluster, a satisfaction score for each of the users in the given user cluster based on the obtained usage data for each user on the at least one computing device; providing one or more suggested hardware upgrades for the at least one computing device of at least one user in the given user cluster, wherein the at least one user is selected based on a lower corresponding satisfaction score relative to the satisfaction scores of other users in the given cluster, and wherein the one or more suggested hardware upgrades are based on hardware configurations of one or more of the other users in the given cluster having the higher corresponding satisfaction score.

In some embodiments, the satisfaction scores are based on a frustration level obtained by correlating interactions of the given user with one or more user input devices of the at least one computing device of the given user with one or more performance indicators of the at least one computing device of the given user.

Other illustrative embodiments include, without limitation, apparatus, systems, methods and computer program products comprising processor-readable storage media.

DETAILED DESCRIPTION

Figure 1:
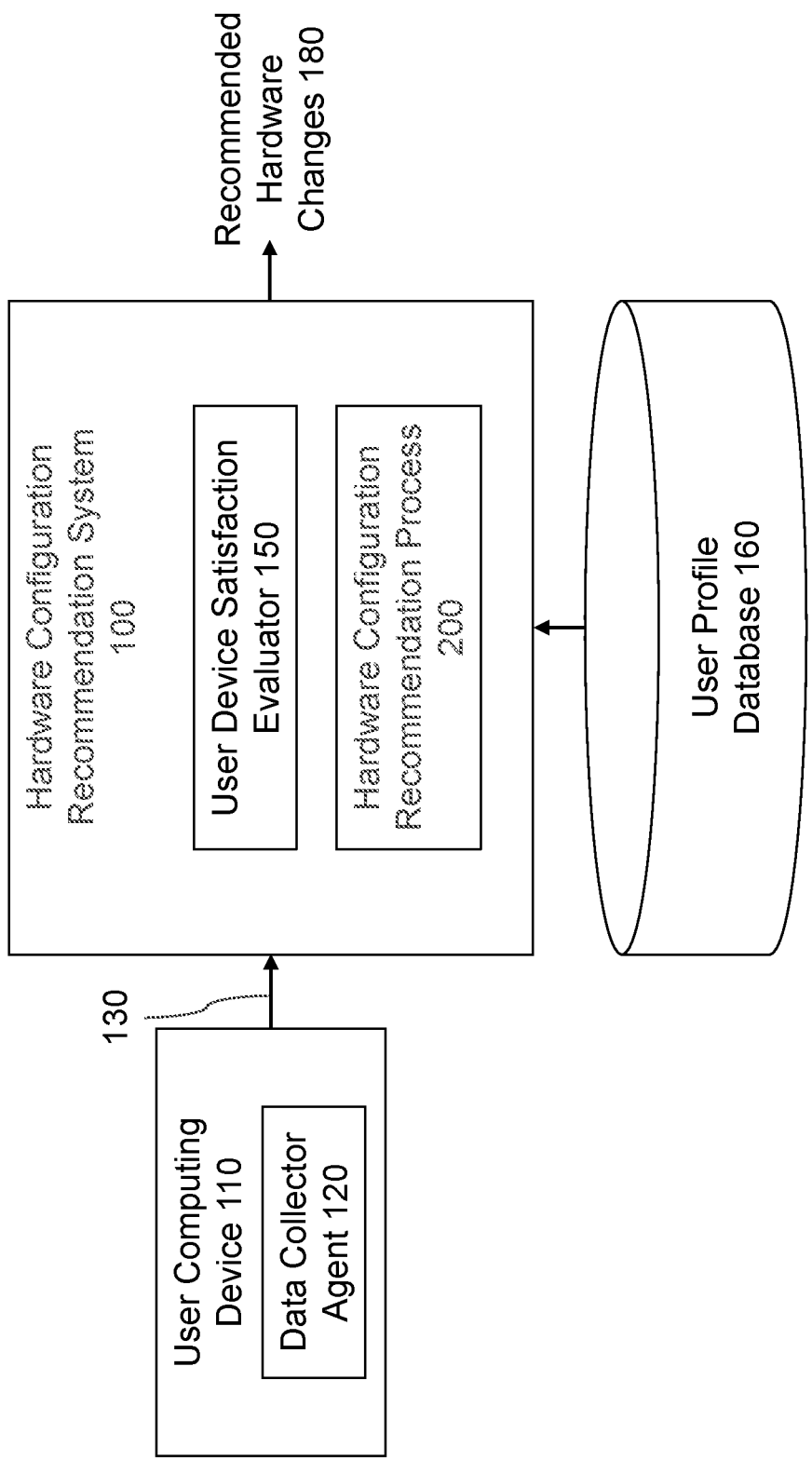
FIG. 1 illustrates a hardware configuration recommendation system, according to an embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide data-driven methods, apparatus and computer program products for recommending changes to a hardware configuration based on a user satisfaction rating.

In one or more embodiments, improved data-driven hardware configuration recommendation techniques are provided based on usage data generated from user activity of an end user and collected using, for example, collector agents provided by the Dell Data Vault® (DDV) data collection system and/or Windows Management Instrumentation (WMI). In some embodiments, the data-driven hardware configuration recommendation techniques recommend hardware upgrades to an existing hardware system. In one exemplary method, the monitored user activity data is employed to map a user to a persona, and then crowd sourcing techniques are employed to calculate a relative satisfaction level. Finally, the disclosed data-driven hardware configuration recommendation techniques proactively generate hardware upgrade suggestions for those users that are determined to be less satisfied, for example, relative to their peers. In this manner, custom tailored recommendations can be provided, based on the actual usage of the user, often without a need for external services (such as a website).

A number of data collection methods can be employed to monitor and evaluate the user behavior. U.S. patent application Ser. No. 16/260,917, filed Jan. 29, 2019, entitled "Run-Time Determination of Application Performance with Low Overhead Impact on System Performance," (now U.S. Pat. No. 11,275,672), incorporated by reference herein in its entirety, for example, provides a system that collects data about the application performance and scores the performance by using one or more machine learning models.

New software seems to arrive on a daily basis and a software team can quickly release a new version. As a result, the usage of applications change and a user may want to explore and experience new applications, leading to a change in the profile of the user. A user might reach a point where what previously worked is no longer working.

When a user suffers from a computing device exhibiting low performance, and the user wants to upgrade the hardware configuration of the computing device, the typical usage of the user needs to be defined. For example, the user profile should convey the software and applications currently being used, as well as how intensively and when and why the user suffers from low performance. A user has a subjective view of the user profile that may lead to wrong conclusions regarding what should be upgraded in the hardware configuration.

It can take a number of performance issues before a user concludes that a hardware upgrade is needed. Dealing with performance issues, when each time the user expects the issue to be a one-time issue, is very frustrating.

Users have the challenge of determining an optimal computing device for their needs. Often, it would be hard to say what configuration would support the needs of the user. It becomes even harder when a user tries to maximize the value for money ratio since the budget is often limited.

Performance issues can be analyzed, and an upgrade solution can be manually generated and offered to overcome the issues. Such an approach, however, is based on the knowledge of domain experts. Since the system of a user can be complex and the components of the system can be dependent, it may be hard even for an expert to determine how a given upgrade will affect a performance of the device of the user.

In many cases, a recommender system of an organization, such as a computer manufacturer or retailer, is integrated in a website, tracking the user interactions and behavior with the website, as well as previous purchases and user profile information. A user persona is built accordingly, and a product can be suggested. A recommender system can generally work well for a new machine, but sometimes there is a need to modify and/or fine tune the existing machine configuration of the user (which would require usage data, which is not typically available to the website).

FIG. 1 illustrates a hardware configuration recommendation system 100, according to an embodiment of the disclosure. As shown in FIG. 1, the exemplary hardware configuration recommendation system 100 processes usage data 130 collected from a user computing device 110, for example, by a data collector agent 120. The data collector agent 120 may be implemented, for example, using the teachings of U.S. patent application Ser. No. 16/260,917 (now U.S. Pat. No. 11,275,672), referenced above, or another existing end-device data collection mechanism, such as the collector agents provided by the DDV data collection system and/or WMI.

The exemplary hardware configuration recommendation system 100 comprises a user device satisfaction evaluator 150 and a hardware configuration recommendation process 200, as discussed further below in conjunction with FIG. 2. The exemplary user device satisfaction evaluator 150 may be implemented, for example, using the teachings of U.S. patent application Ser. No. 16/402,822, filed contemporaneously herewith, entitled, "Method and System for Addressing User Discontent Observed on Client Devices," incorporated by reference herein in its entirety. Generally, data-driven techniques are provided for determining a user satisfaction level with respect to personal computing devices.

In one embodiment of the disclosure, the user satisfaction level with respect to a given device may refer to a degree of confidence that a user of a given device is satisfied (or dissatisfied) with the given device. For example, in at least some embodiments, a user satisfaction agent on the given device may comprise functionality to process a set of features (e.g., measurable properties or characteristics) pertinent to user dissatisfaction for discontent) and/or responses to a user survey. Each feature may refer to a factor (or variable), observed on the given device, that may, at least in part, cause or exhibit user discontent with the given device. For example, these features may include a number of device crashes and/or a number of user-initiated device restarts in a time period, and/or input device (e.g., keyboard and mouse) usage patterns, where higher usage frequency and/or intensity may infer that a user, operating the device, is stressed or angry, which may indicate user discontent.

The features and/or survey responses may be applied to one or more machine learning models (e.g., trained using supervised learning techniques) in some embodiments to obtain a user satisfaction score.

In some embodiments, the exemplary user device satisfaction evaluator 150 generates a satisfaction score comprising a relative satisfaction score of multiple users in a given user cluster (e.g., identifying the most satisfied users), and/or an absolute satisfaction score for each user in the given user cluster.

The exemplary hardware configuration recommendation system 100 generates a user profile for the user for storage in a user profile database 160 and one or more recommended hardware changes 180 to the current configuration of the user computing device 110, as discussed further below in conjunction with FIG. 2. Generally, as discussed further below, the exemplary hardware configuration recommendation process 200 clusters the users according to the respective user profiles. Within each cluster, the exemplary hardware configuration recommendation process 200 calculates a relative satisfaction level for each member of the cluster and then suggests upgrades for the less satisfied users of a cluster, for example, with a different value-for-money ratio. The different suggested upgrades are based on the hardware configurations of the more satisfied consumers in the cluster, while the system will take into account constraints between different components, as discussed further below.

In some embodiments, for any new user, a user profile is automatically produced for storage in the user profile database 160 and the user is assigned to an appropriate cluster and receives an upgrade recommendation, if needed. Handling a new consumer is a low foot print action.

Figure 2:
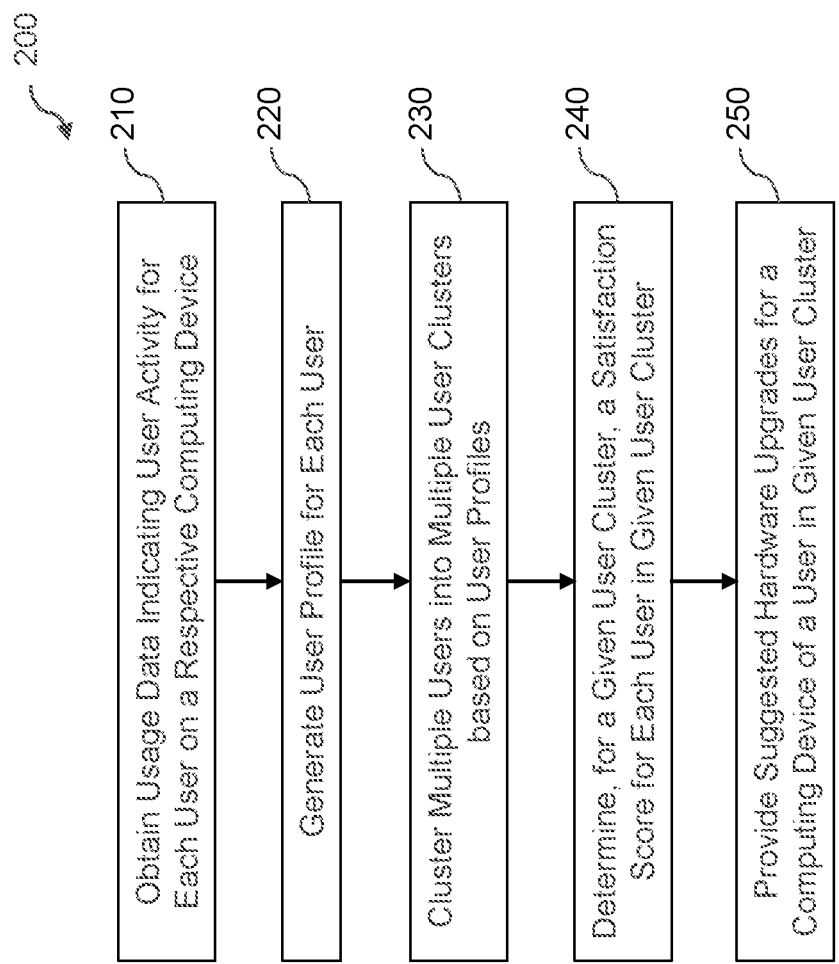
FIG. 2 is a flow chart illustrating an exemplary implementation of a hardware configuration recommendation process, according to some embodiments.

FIG. 2 is a flow chart illustrating an exemplary implementation of a hardware configuration recommendation process 200, according to some embodiments. As shown in FIG. 2, the exemplary hardware configuration recommendation process 200 initially obtains usage data during step 210 indicating user activity for each of a plurality of users on at least one computing device 110. Thereafter, the hardware configuration recommendation process 200 generates a user profile during step 220 for each of the plurality of users. In some embodiments, each unique combination of a user and a device generates a user profile. A user profile can be defined, for example, as a set of features. Generally, as much information as possible regarding the user is extracted and captured from the usage data collected by the exemplary data collector agents 120. A set of such features can include, for example, statistics on central processing unit (CPU) usage on a weekly basis (e.g., maximum, minimum, median), usage peak hours, a list of running application, and the applications most used.

During step 230, the exemplary hardware configuration recommendation process 200 clusters the plurality of users into a plurality of user clusters based on the user profiles. A user profile definition comprising n features, for example, for each user, allows the value of the n features to be calculated. In the present setting, each user can be represented, for example, as a point in an n-dimensional space and a clustering algorithm can be applied, such as k-mean technique to cluster the user. The parameter k represents the number of clusters and can be determined by a domain expert, business needs or by finding a substantially optimal value of k by using direct or statistical testing methods, as discussed further below in conjunction with FIG. 3. Generally, each cluster typically comprises a large number of users, as some embodiments leverage crowd sourcing techniques.

For a given user cluster, the exemplary hardware configuration recommendation process 200 determines a satisfaction score for each of the users in the given user cluster during step 240 based on the obtained usage data 130 for each user on the at least one computing device 110, for example, using the exemplary user device satisfaction evaluator 150 to determine the satisfaction scores.

For example, a relative satisfaction level can be calculated. Generally, user interactions with the computing device 110 (e.g., mouse movements and keyboard activity) are tracked together with performance indicators to detect dissatisfaction of a user. The mood of a user is detected based on his or her user interactions and a level of satisfaction is inferred by correlating the mouse movement data, for example, with the performance data of the computing device 110. In the present context, low performance for a user suggests that the user is dissatisfied and that an upgrade or system modification is warranted.

Finally, during step 250, the exemplary hardware configuration recommendation process 200 provides the one or more suggested hardware upgrades (recommended hardware changes 180) for the at least one computing device 110 of at least one user in the given user cluster. Generally, after the calculation of the satisfaction of the users is done, one can cluster the users based on their satisfaction level. For each satisfaction level, a recommended hardware configuration is chosen, such as the most common one. The outcome of the hardware configuration recommendation process 200 is that for a specific group of users there is a satisfaction level assigned to a hardware configuration. The suggested hardware upgrades to less satisfied users of the cluster are based on hardware configurations of the other users in the given cluster having the higher corresponding satisfaction scores.

In some embodiments, the suggested hardware upgrades provided during step 250 identify relevant recommendations (e.g., users with a similar device, if possible, to provide a minor change in hardware configuration) for any user profile (e.g., each combination of user and device) from a low satisfaction level cluster in high satisfaction level. In other words, several upgrade options can be suggested with a price/satisfaction tradeoff. The processing occurs in a cluster of similar user usage; thus, the only potential difference between the members of the cluster in this embodiment is the device that they are using.

In this manner, some embodiments of the disclosed data-driven hardware configuration recommendation system 100 proactively approach less satisfied users of a given cluster and recommend several possible upgrades to them with different configurations based on the current configurations of more satisfied users of a given cluster (e.g., recommend configurations that have been proven in the field for comparable users).

Figure 3:
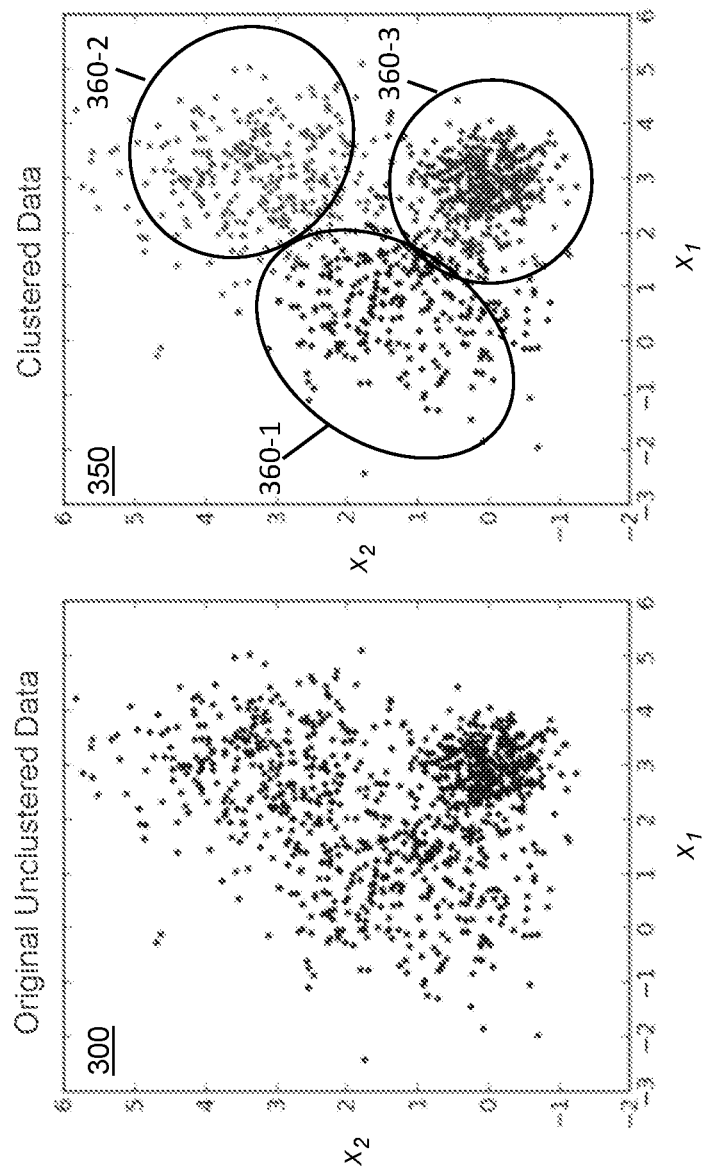
FIG. 3 illustrates an exemplary clustering of user data points in a multi-dimensional space of original unclustered user data into clustered data, according to at least embodiment.

FIG. 3 illustrates an exemplary clustering of user data points in a two-dimensional space of original unclustered user data 300 into clustered data 350, comprising, for example, three exemplary clusters 360-1 through 360-3. Any existing clustering technique may be employed, as would be apparent to a person of ordinary skill in the art.

In one or more embodiments, the disclosed hardware configuration recommendation system 100 provides an automated and proactive recommendation system for hardware configuration. Among other benefits, this capability provides an increased differentiation with respect to other computer vendors.

In some embodiments, the disclosed data-driven hardware configuration recommendation techniques provide improved hardware recommendations relative to a conventional recommender system.

One or more embodiments of the disclosure provide improved methods, apparatus and computer program products for providing hardware configuration recommendations. The foregoing applications and associated embodiments should be considered as illustrative only, and numerous other embodiments can be configured using the techniques disclosed herein, in a wide variety of different applications.

It should also be understood that the disclosed hardware configuration recommendation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for generating hardware configuration recommendations may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based hardware configuration recommendation system 100, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based hardware configuration recommendation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. These platforms may also be used to implement at least portions of other information processing systems in other embodiments.

Figure 4:
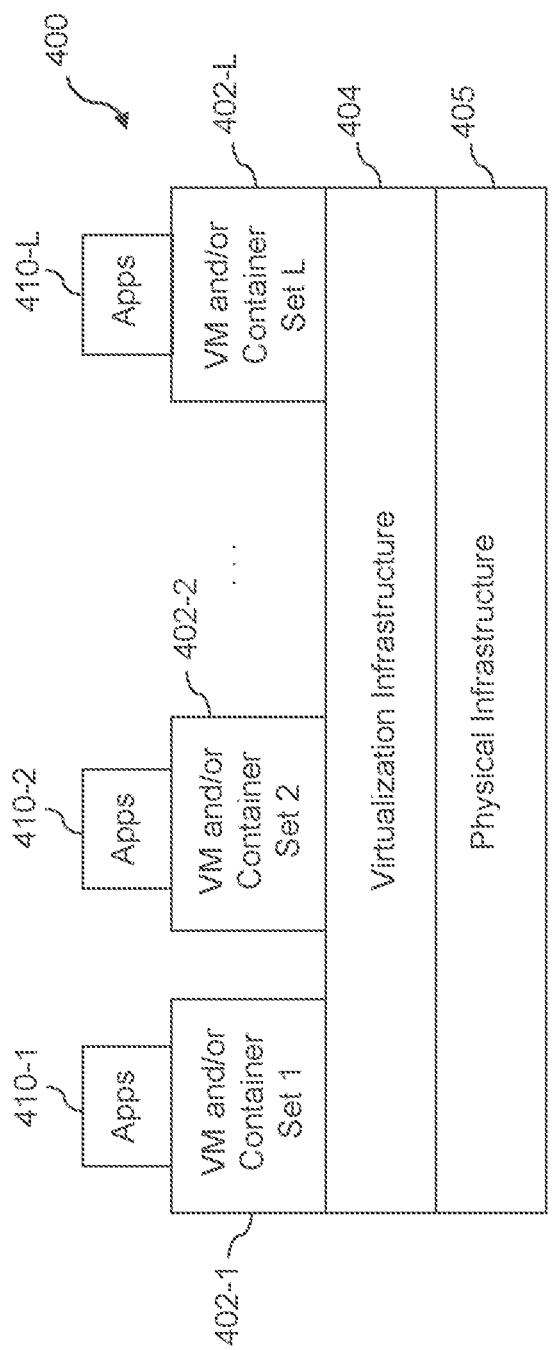
FIG. 4 illustrates an exemplary processing platform that may be used to implement at least a portion of one or more embodiments of the disclosure comprising a cloud infrastructure.

FIG. 4 shows an example processing platform comprising cloud infrastructure 400. The cloud infrastructure 400 comprises a combination of physical and virtual processing resources that may be utilized to implement at least a portion of the hardware configuration recommendation system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide hardware configuration recommendation functionality of the type described above for one or more processes running on a given one of the VMs. For example, each of the VMs can implement hardware configuration recommendation control logic and associated clustered user profiles for providing hardware configuration recommendation generation functionality for one or more processes running on that particular VM.

An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can provide hardware configuration recommendation generation functionality of the type described above for one or more processes running on different ones of the containers. For example, a container host device supporting multiple containers of one or more container sets can implement one or more instances of hardware configuration recommendation control logic and associated clustered user profiles for use in generating hardware configuration recommendations.

As is apparent from the above, one or more of the processing modules or other components of hardware configuration recommendation system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises at least a portion of the given system and includes a plurality of processing devices, denoted 502-1, 502-2, 502-3, . . . 502-K, which communicate with one another over a network 504. The network 504 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 502-1 in the processing platform 500 comprises a processor 510 coupled to a memory 512. The processor 510 may comprise a microprocessor, a microcontroller, an application specific integrated circuit (ASIC), a field programmable gate array (FPGA) or other type of processing circuitry, as well as portions or combinations of such circuitry elements, and the memory 512, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and the given system may include additional or alternative processing platforms, as well as numerous distinct processing platforms in any combination, with each such platform comprising one or more computers, storage devices or other processing devices.

Figure 5:
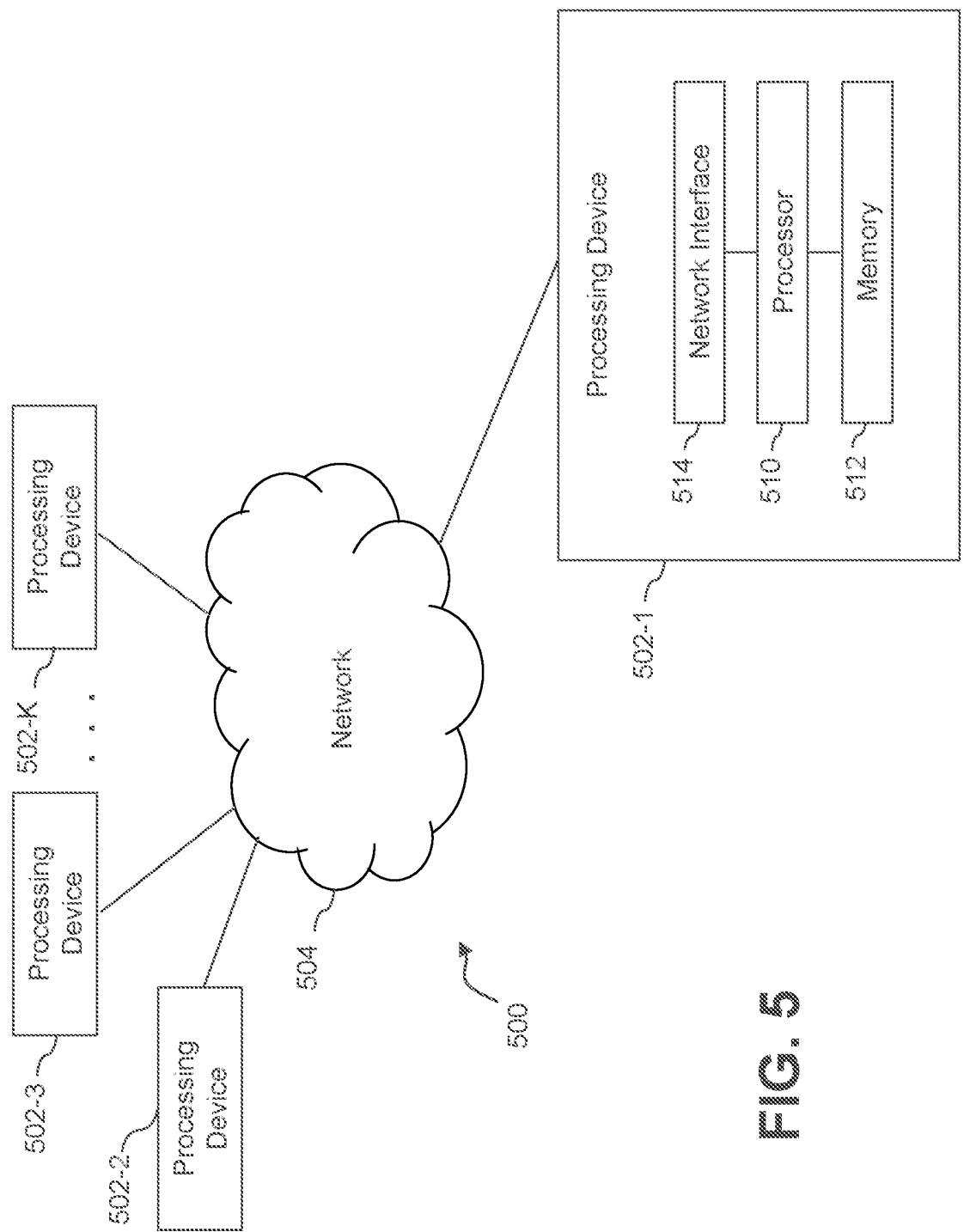
FIG. 5 illustrates another exemplary processing platform that may be used to implement at least a portion of one or more embodiments of the disclosure.

Multiple elements of an information processing system may be collectively implemented on a common processing platform of the type shown in FIG. 4 or 5, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining usage data indicating user activity for each of a plurality of users on at least one computing device, wherein the usage data indicating user activity for a given user comprises one or more of interactions of the given user with one or more user input devices of the at least one computing device of the given user and one or more performance indicators of the at least one computing device of the given user;
generating a user profile for each of the plurality of users, wherein the user profile for a given user comprises a plurality of usage features generated using the user activity of the given user on the at least one computing device from the obtained usage data;
clustering the plurality of users into a plurality of user clusters based on the plurality of usage features in the user profile, wherein the plurality of user clusters is maintained in at least one memory and wherein a new user is automatically assigned to a particular one of the plurality of user clusters;
determining, for a given user cluster, a satisfaction score for each of the users in the given user cluster using the obtained usage data for each user on the at least one computing device, wherein the satisfaction score for a given user indicates a satisfaction level of the given user with respect to the at least one computing device;
providing one or more suggested hardware upgrades for the at least one computing device of at least one user in the given user cluster, wherein the at least one user is selected based on the at least one user having a lower corresponding satisfaction score relative to the satisfaction scores of other users in the given user cluster, and wherein the one or more suggested hardware upgrades are based on a hardware configuration of one or more of the other users in the given user cluster having a higher corresponding satisfaction score than the satisfaction score of the at least one user, wherein the providing the one or more suggested hardware upgrades for the at least one computing device of at least one user in the given user cluster further comprises further clustering the plurality of users in the given user cluster based on the satisfaction scores into a plurality of satisfaction clusters, and for at least one user profile in a low satisfaction cluster, determining a recommended hardware configuration based on a configuration of at least one device of a user profile of a high satisfaction cluster;
wherein the method is performed by at least one processing device comprising a processor coupled to a memory.

2. The method of claim 1, wherein each of the user profiles for the plurality of users comprises a plurality of key performance indicators extracted from the obtained usage data.

3. The method of claim 1, wherein the satisfaction score comprises one or more of a relative satisfaction score of the users in the given user cluster and an absolute satisfaction score for each of the users in the given user cluster.

4. The method of claim 1, wherein the satisfaction scores are based on a frustration level obtained by correlating interactions of the given user with one or more user input devices of the at least one computing device of the given user with one or more performance indicators of the at least one computing device of the given user.

5. The method of claim 1, wherein the obtaining usage data indicating user activity on at least one computing device is performed by one or more collector agents deployed on the at least one computing device of a given user.

6. The method of claim 1, wherein the usage features generated using the user activity of the given user on the at least one computing device comprise one or more of a resource usage feature, a peak time usage feature, an executing applications feature and an application usage feature.

7. The method of claim 1, wherein the user satisfaction score is obtained using one or more machine learning models.

8. A computer program product, comprising a tangible machine-readable storage medium having encoded therein executable code of one or more software programs, wherein the one or more software programs when executed by at least one processing device perform the following steps:

obtaining usage data indicating user activity for each of a plurality of users on at least one computing device, wherein the usage data indicating user activity for a given user comprises one or more of interactions of the given user with one or more user input devices of the at least one computing device of the given user and one or more performance indicators of the at least one computing device of the given user;

generating a user profile for each of the plurality of users, wherein the user profile for a given user comprises a plurality of usage features generated using the user activity of the given user on the at least one computing device from the obtained usage data;

clustering the plurality of users into a plurality of user clusters based on the plurality of usage features in the user profile, wherein the plurality of user clusters is maintained in at least one memory and wherein a new user is automatically assigned to a particular one of the plurality of user clusters;

determining, for a given user cluster, a satisfaction score for each of the users in the given user cluster using the obtained usage data for each user on the at least one computing device, wherein the satisfaction score for a given user indicates a satisfaction level of the given user with respect to the at least one computing device;

providing one or more suggested hardware upgrades for the at least one computing device of at least one user in the given user cluster, wherein the at least one user is selected based on the at least one user having a lower corresponding satisfaction score relative to the satisfaction scores of other users in the given user cluster, and wherein the one or more suggested hardware upgrades are based on a hardware configuration of one or more of the other users in the given user cluster having a higher corresponding satisfaction score than the satisfaction score of the at least one user, wherein the providing the one or more suggested hardware upgrades for the at least one computing device of at least one user in the given user cluster further comprises further clustering the plurality of users in the given user cluster based on the satisfaction scores into a plurality of satisfaction clusters, and for at least one user profile in a low satisfaction cluster, determining a recommended hardware configuration based on a configuration of at least one device of a user profile of a high satisfaction cluster.

9. The computer program product of claim 8, wherein each of the user profiles for the plurality of users comprises a plurality of key performance indicators extracted from the obtained usage data.

10. The computer program product of claim 8, wherein the satisfaction score comprises one or more of a relative satisfaction score of the users in the given user cluster and an absolute satisfaction score for each of the users in the given user cluster.

11. The computer program product of claim 8, wherein the satisfaction scores are based on a frustration level obtained by correlating interactions of the given user with one or more user input devices of the at least one computing device of the given user with one or more performance indicators of the at least one computing device of the given user.

12. The computer program product of claim 8, wherein the usage features generated using the user activity of the given user on the at least one computing device comprise one or more of a resource usage feature, a peak time usage feature, an executing applications feature and an application usage feature.

13. The computer program product of claim 8, wherein the user satisfaction score is obtained using one or more machine learning models.

14. An apparatus, comprising:

a memory; and at least one processing device, coupled to the memory, operative to implement the following steps:

obtaining usage data indicating user activity for each of a plurality of users on at least one computing device, wherein the usage data indicating user activity for a given user comprises one or more of interactions of the given user with one or more user input devices of the at least one computing device of the given user and one or more performance indicators of the at least one computing device of the given user;

generating a user profile for each of the plurality of users, wherein the user profile for a given user comprises a plurality of usage features generated using the user activity of the given user on the at least one computing device from the obtained usage data;

clustering the plurality of users into a plurality of user clusters based on the plurality of usage features in the user profile, wherein the plurality of user clusters is maintained in at least one memory and wherein a new user is automatically assigned to a particular one of the plurality of user clusters;

determining, for a given user cluster, a satisfaction score for each of the users in the given user cluster using the obtained usage data for each user on the at least one computing device, wherein the satisfaction score for a given user indicates a satisfaction level of the given user with respect to the at least one computing device;

providing one or more suggested hardware upgrades for the at least one computing device of at least one user in the given user cluster, wherein the at least one user is selected based on the at least one user having a lower corresponding satisfaction score relative to the satisfaction scores of other users in the given user cluster, and wherein the one or more suggested hardware upgrades are based on a hardware configuration of one or more of the other users in the given user cluster having a higher corresponding satisfaction score than the satisfaction score of the at least one user, wherein the providing the one or more suggested hardware upgrades for the at least one computing device of at least one user in the given user cluster further comprises further clustering the plurality of users in the given user cluster based on the satisfaction scores into a plurality of satisfaction clusters, and for at least one user profile in a low satisfaction cluster, determining a recommended hardware configuration based on a configuration of at least one device of a user profile of a high satisfaction cluster.

15. The apparatus of claim 14, wherein each of the user profiles for the plurality of users comprises a plurality of key performance indicators extracted from the obtained usage data.

16. The apparatus of claim 14, wherein the satisfaction score comprises one or more of a relative satisfaction score of the users in the given user cluster and an absolute satisfaction score for each of the users in the given user cluster.

17. The apparatus of claim 14, wherein the satisfaction scores are based on a frustration level obtained by correlating interactions of the given user with one or more user input devices of the at least one computing device of the given user with one or more performance indicators of the at least one computing device of the given user.

18. The apparatus of claim 14, wherein the step of obtaining usage data indicating user activity on at least one computing device is performed by one or more collector agents deployed on the at least one computing device of a given user.

19. The apparatus of claim 14, wherein the usage features generated using the user activity of the given user on the at least one computing device comprise one or more of a resource usage feature, a peak time usage feature, an executing applications feature and an application usage feature.

20. The apparatus of claim 14, wherein the user satisfaction score is obtained using one or more machine learning models.

* * * * *